US009185162B2

(12) United States Patent
Zhang et al.

(10) Patent No.: US 9,185,162 B2
(45) Date of Patent: Nov. 10, 2015

(54) SYSTEM USING SERVER TO SYNCHRONIZE DOCUMENT DISPLAYED ON MOBILE DEVICES

(71) Applicant: Tencent Technology (Shenzhen) Company Limited, Shenzhen, Guangdong Province (CN)

(72) Inventors: Xiaolong Zhang, Shenzhen (CN); Kunfeng Rong, Shenzhen (CN); Wenxiao Chen, Shenzhen (CN); Zhiyuan Lin, Shenzhen (CN); Shaomian Yao, Shenzhen (CN); Yueteng Weng, Shenzhen (CN); Xiao Sun, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 352 days.

(21) Appl. No.: 13/906,026

(22) Filed: May 30, 2013

(65) Prior Publication Data

US 2014/0059115 A1  Feb. 27, 2014

(30) Foreign Application Priority Data

Aug. 27, 2012 (CN) .......................... 2012 1 0307695

(51) Int. Cl.
*G06F 17/30* (2006.01)
*H04L 29/08* (2006.01)
*H04L 12/18* (2006.01)
(Continued)

(52) U.S. Cl.
CPC .......... *H04L 67/10* (2013.01); *G06F 17/30879* (2013.01); *G06F 17/30899* (2013.01);
(Continued)

(58) Field of Classification Search
CPC .......... G06F 17/30899; G06F 2216/15; H04L 12/1822; H04L 12/1813; H04L 65/1066; H04L 65/1069; H04N 21/8173
See application file for complete search history.

(56) References Cited

U.S. PATENT DOCUMENTS 6,393,462 B1    5/2002  Mullen-Schultz
6,418,471 B1 *  7/2002  Shelton et al. ................. 709/227
(Continued)

FOREIGN PATENT DOCUMENTS

CN       1867142 A      11/2006
CN     102420782 A       4/2012
(Continued)

OTHER PUBLICATIONS

Tencent Technology (Shenzhen) Company Limited, International Search Report and Written Opinion, PCT/CN2013/076325, Sep. 5, 2013, 10 pgs.

*Primary Examiner* — Le H Luu
(74) *Attorney, Agent, or Firm* — Morgan, Lewis & Bockius LLP

(57) ABSTRACT

Embodiments of the present invention disclose an information transmission method, apparatus, and system, and a terminal, and a server. The information transmission method may include: sending, by a first mobile terminal, an information transmission instruction to a plug-in associated with the first mobile terminal; acquiring, by the plug-in, according to the information transmission instruction, link information of a current webpage in a browser where the plug-in is located, and sending the link information to a server; and acquiring, by the server, webpage information of the current webpage according to the link information, and sending the webpage information of the current webpage to the first mobile terminal. The present invention can implement information transmission, and improve the convenience of information transmission.

20 Claims, 26 Drawing Sheets

(51) Int. Cl.
*H04L 29/06* (2006.01)
*H04N 21/81* (2011.01)

(52) U.S. Cl.
CPC ........ *H04L 12/1813* (2013.01); *H04L 12/1822* (2013.01); *H04L 65/1066* (2013.01); *H04L 65/1069* (2013.01); *H04L 67/02* (2013.01); *H04L 67/1097* (2013.01); *H04L 67/141* (2013.01); *H04L 67/18* (2013.01); *H04N 21/8173* (2013.01); *G06F 2216/15* (2013.01)

(56) References Cited

U.S. PATENT DOCUMENTS

| | | | |
|---|---|---|---|
| 6,654,785 B1 * | 11/2003 | Craig | 709/203 |
| 7,263,547 B2 * | 8/2007 | Kloba et al. | 709/217 |
| 2002/0083098 A1 * | 6/2002 | Nakamura | 707/513 |
| 2002/0143859 A1 * | 10/2002 | Kuki et al. | 709/203 |
| 2009/0265163 A1 * | 10/2009 | Li et al. | 704/10 |
| 2012/0089659 A1 * | 4/2012 | Halevi et al. | 709/201 |
| 2012/0260195 A1 * | 10/2012 | Hon et al. | 715/753 |
| 2013/0046815 A1 * | 2/2013 | Thomas et al. | 709/203 |
| 2013/0339536 A1 * | 12/2013 | Burckart et al. | 709/229 |

FOREIGN PATENT DOCUMENTS

| | | | |
|---|---|---|---|
| CN | 102510405 A | 6/2012 | |
| CN | 102811261 A | 12/2012 | |
| CN | 103023930 A | 4/2013 | |

* cited by examiner

SYSTEM USING SERVER TO SYNCHRONIZE DOCUMENT DISPLAYED ON MOBILE DEVICES

RELATED APPLICATION

This application claims priority to Chinese Patent Application No. 201210307695.9, entitled "INFORMATION TRANSMISSION METHOD, APPARATUS, AND SYSTEM, TERMINAL, AND SERVER," filed on Aug. 27, 2012, which is incorporated by reference in its entirety.

TECHNICAL FIELD

The disclosed implementations relate generally to the field of Internet technologies, and in particular, to the field of information transmission technologies, and specifically, to an information transmission method, apparatus, and system, a terminal, and a server.

BACKGROUND

With the development of the Internet and terminal technologies, people can acquire information by using the Internet, for example, use a browser in a PC (Personal Computer, personal computer) to browse webpage information; and people can also experience various applications of a terminal, for example, experience an instant communication application in a mobile phone. If a user browses a webpage by using a browser of a PC, and intends to use the webpage in an instant communication application in a mobile phone, a conventional solution may be that: the user stores information of the webpage locally, copies the information to the mobile phone by using a USB flash drive, and invokes the information in the instant communication application of the mobile phone; or the PC uploads the information to a cloud server, and the mobile phone logs in to the cloud server, downloads the information from the cloud server, and invokes the information in the instant communication application.

In the development trend of information exchange, the conventional information transmission solutions that require a storage medium or operations such as uploading and downloading increase the operational complexity, failing to meet actual requirements of users for convenience of information transmission. Therefore, how to improve the convenience of information transmission becomes an urgent technical problem to be solved.

SUMMARY

Embodiments of the present invention provide an information transmission method, apparatus, and system, a terminal, and a server, which can implement information transmission, and improve the convenience of information transmission.

In accordance with some implementations of the present application, an information transmission method is performed at a first mobile terminal having a processor and memory for storing one or more programs to be executed by the processor. The first mobile terminal detects a predefined user operation on the first mobile terminal to retrieve information from an application running on a second terminal. The application is associated with the first mobile terminal through a remote server. In response to the predefined user operation, the first mobile terminal sends an information transmission instruction to the application at the second terminal through the remote server. The application is configured to return an identifier of a document currently displayed on the second terminal to the remote server in response to the information transmission instruction. After receiving the document identifier and data associated with the document from the remote server, the first mobile terminal displays the received document identifier and the data on a display of the first mobile terminal. In some implementations, the data is derived from a predefined type of content in the document (e.g., images). In some implementations, the application is a plug-in of a web browser running on the second terminal and the document is a web page displayed in the web browser.

In accordance with some implementations of the present application, an information transmission method is performed at a second terminal having a processor and memory for storing one or more programs to be executed by the processor. The second terminal activates an application at the second terminal, which is associated with a first mobile terminal through a remote server. In response to an information transmission instruction sent from the first mobile terminal, the second terminal obtains a document identifier of a document currently displayed on the second terminal and sends the document identifier to the remote server. In response, the remote server is configured to retrieve data associated with the document and send the document identifier and the retrieved data to the first mobile terminal. In some implementations, the application is a plug-in of a web browser running on the second terminal and the document is a web page displayed in the web browser.

In accordance with some implementations of the present application, a first mobile terminal includes one or more processors; and memory storing one or more programs. The one or more programs, when executed by the one or more processors, cause the first mobile terminal to: detect a predefined user operation on the first mobile terminal to retrieve information from an application running on a second terminal, wherein the application is associated with the first mobile terminal through a remote server; in response to the predefined user operation, send an information transmission instruction to the application at the second terminal through the remote server, wherein the application is configured to return an identifier of a document currently displayed on the second terminal to the remote server in response to the information transmission instruction; receive the document identifier and data associated with the document from the remote server, wherein the data is derived from a predefined type of content in the document; and display the received document identifier and the data on a display of the first mobile terminal. In some implementations, the application is a plug-in of a web browser running on the second terminal and the document is a web page displayed in the web browser.

In a first aspect, the present invention provides an information transmission method, including:

sending, by a first mobile terminal, an information transmission instruction to a plug-in bound to the first mobile terminal;

acquiring, by the plug-in, according to the information transmission instruction, link information of a current webpage in a browser where the plug-in is located, and sending the link information to a server; and acquiring, by the server, webpage information of the current webpage according to the link information, and sending the webpage information of the current webpage to the first mobile terminal.

In a second aspect, the present invention provides another information transmission method, including:

receiving, by a plug-in, an information transmission instruction sent by a first mobile terminal bound to the plug-in.

acquiring, by the plug-in, according to the information transmission instruction, link information of a current webpage in a browser where the plug-in is located; and sending, by the plug-in, the link information to a server, so that the server sends webpage information of the current webpage to the first mobile terminal according to the link information.

In a third aspect, the present invention provides still another information transmission method, including:

sending, by a first mobile terminal, an information transmission instruction to a plug-in bound to the first mobile terminal, so that the plug-in sends link information of a current webpage in a browser where the plug-in is located to a server according to the information transmission instruction; and receiving, by the first mobile terminal, webpage information, of the current webpage, sent by the server according to the link information.

In a fourth aspect, the present invention provides still another information transmission method, including:

receiving, by a server, link information, sent by a plug-in, of a current webpage in a browser where the plug-in is located;

acquiring, by the server, webpage information of the current webpage according to the link information; and sending, by the server, the webpage information of the current webpage to a first mobile terminal bound to the plug-in.

In a fifth aspect, the present invention provides an information transmission apparatus, including:

an instruction receiving module, configured to receive an information transmission instruction from a first mobile terminal bound to the information transmission apparatus;

an information acquiring module, configured to acquire, according to the information transmission instruction, link information of a current webpage in a browser where the information transmission apparatus is located; and an information transmission module, configured to send the link information to a server, so that the server sends webpage information of the current webpage to the first mobile terminal according to the link information.

In a sixth aspect, the present invention provides a terminal, including a browser, and further including: a management module, configured to load the information transmission apparatus provided in the fifth aspect in the browser, and manage the information transmission apparatus.

In a seventh aspect, the present invention provides another terminal, including:

an instruction module, configured to send an information transmission instruction to a plug-in bound to the terminal, so that the plug-in sends link information of a current webpage in a browser where the plug-in is located to a server according to the information transmission instruction; and an information transmission module, configured to receive webpage information, of the current webpage, sent by the server according to the link information.

In a ninth aspect, the present invention provides a server, including:

a link receiving module, configured to receive link information, sent by a plug-in, of a current webpage in a browser where the plug-in is located;

an information acquiring module, configured to acquire webpage information of the current webpage according to the link information; and an information transmission module, configured to send the webpage information of the current webpage to a first mobile terminal bound to the plug-in.

In a tenth aspect, the present invention provides an information transmission system, including: a first mobile terminal, a second terminal, and a server, where the first mobile terminal is the terminal provided in the seventh aspect, the second terminal is the terminal provided in the sixth aspect, and the server is the server provided in the ninth aspect.

In an eleventh aspect, the present invention provides a computer storage medium, where the computer storage medium stores a program, and the program, when being executed, includes a part or all of the steps in the methods above.

By implementing the embodiments of the present invention, the following beneficial effects are obtained.

In the embodiments of the present invention, a plug-in captures, according to an information transmission instruction from a terminal bound to the plug-in, link information of a current webpage in a browser where the plug-in is located, and sends the link information to a server to trigger the server to return webpage information of the current webpage to the terminal bound to the plug-in, thereby implementing information transmission between the plug-in of the browser and the terminal that are bound to each other, and improving the convenience of information transmission.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

To illustrate the technical solutions in the embodiments of the present invention or in the prior art more clearly, the accompanying drawings required for describing the embodiments or the prior art are briefly described in the following. Apparently, the accompanying drawings in the following descriptions merely show some embodiments of the present invention, and those of ordinary skill in the art may still derive other drawings from the accompanying drawings without creative efforts.

DETAILED DESCRIPTION

Figure 1:
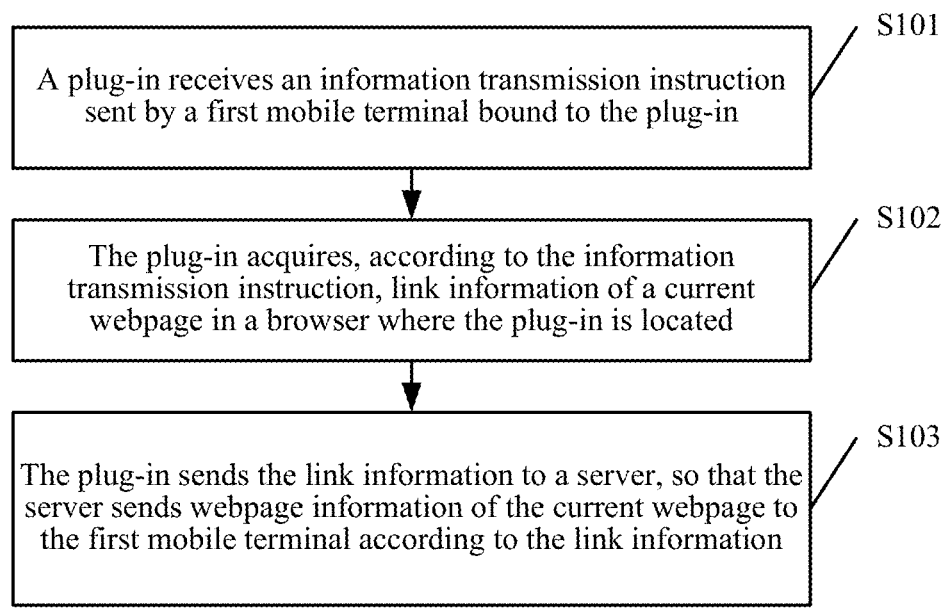
FIG. 1 is a flow chart of an information transmission method according to an embodiment of the present invention.

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by those of ordinary skill in the art based on the embodiment of the present invention without creative efforts shall fall within the protection scope of the present invention.

In the embodiments of the present invention, a plug-in is a program written through an application interface in compliance with a certain specification, and after the plug-in is installed, an information transmission process may be executed by using the plug-in. A terminal may include: a device such as a PC, a tablet computer, a mobile phone, a smart phone, an electronic reader, a notebook computer, and a vehicle-mounted terminal. In the embodiments of the present invention, a first mobile terminal may be a terminal of any type, and preferably be a mobile terminal that can detect, through a built-in gravity sensor, an action of shaking the first mobile terminal by a user, so as to generate a gravity sensing event, or a mobile terminal that can detect voice information input by the user, so as to form a voice control command, or a mobile terminal that is provided with a particular key, including a particular icon key or a particular physical key, and can detect an action of clicking the particular key by the user, so as to generate a particular key press event. A second terminal may be a terminal of any type, and is installed with a browser, which may be configured to browse a webpage of the Internet, and may be configured to load a plug-in. Unless otherwise stated, in the following embodiments, a browser where the plug-in is located refers to the browser where the plug-in is loaded in the second terminal.

In the embodiments of the present invention, the plug-in is bound to the first mobile terminal by binding entry information of the plug-in to account information of the first mobile terminal. The entry information of the plug-in includes address information and identification information of the plug-in. The address information includes a URL (Uniform/Universal Resource Locator, uniform/universal resource locator) address of the plug-in or a storage address of the plug-in. The identification information is used for uniquely identifying the plug-in, and the identification information may be an ID (Identity, identity identification number) or a sequence number of the plug-in. The account information is preferably account information of a user of an application of the first mobile terminal, for example, account information of a user for logging in to an instant communication application in the first mobile terminal. To protect the account privacy of a user, preferably, one plug-in is only bound to one piece of account information of the first mobile terminal at the same time; and the user may remove, in a setting interface of the first mobile terminal, binding between the plug-in and the account information of the first mobile terminal, or modify the account information bound to the plug-in. It should be noted that, after receiving information transmitted by the plug-in, the first mobile terminal may display the information in a built-in browser of an application of the first mobile terminal, or share the information with other terminal users or in other applications of the first mobile terminal.

An information transmission method provided by an embodiment of the present invention is described in detail in the following with reference to FIG. 1 to FIG. 6.

FIG. 1 is a flow chart of an information transmission method according to an embodiment of the present invention. The method may be an information transmission process executed by a plug-in loaded in a browser of a second terminal. The method may include Step S101 to Step S103.

S101: A plug-in receives an information transmission instruction sent by a first mobile terminal bound to the plug-in.

In this step, the information transmission instruction may be an instruction issued by the first mobile terminal according to a gravity sensing event. For example, the first mobile terminal detects a gravity sensing event generated by a user shaking the terminal, and sends the generated information transmission instruction to the plug-in, to instruct the plug-in to execute information transmission. In this case, preferably, the first mobile terminal has a built-in gravity sensor, for example, a speed sensor, an acceleration sensor, or a gyroscope sensor, and generates a gravity sensing event according to a signal detecting result of the sensor. Alternatively, the information transmission instruction may also be an information transmission instruction issued by the first mobile terminal according to a voice control command. For example, the first mobile terminal detects voice information input by the user, and if the voice information is a preset voice control command, the first mobile terminal generates the information transmission instruction and sends the information transmission instruction to the plug-in, to instruct the plug-in to execute information transmission. In this case, preferably, the first mobile terminal pre-stores a voice control command used for instructing information transmission, and when detecting voice information of the user, determines whether the voice information is matched with (namely, is the same as or similar to) the preset voice control command. Alternatively, the information transmission instruction may also be an instruction issued by the first mobile terminal according to a particular key press event. For example, the user of the first mobile terminal clicks a particular key on the first mobile terminal and a particular key press event is generated, the first mobile terminal generates the information transmission instruction and sends the information transmission instruction to the plug-in, to instruct the plug-in to execute information transmission. In this case, preferably, the first mobile terminal is preset with a particular key, which may include a particular icon key or a particular physical key.

S102: The plug-in acquires, according to the information transmission instruction, link information of a current webpage in a browser where the plug-in is located.

The link information includes: website information of the current webpage and link address information of an image in the current webpage. In this step, after receiving the information transmission instruction sent by the bound first mobile terminal, the plug-in may capture the website information of the current webpage in the browser where the plug-in is located and the link address information of the image in the current webpage.

S103: The plug-in sends the link information to a server, so that the server sends webpage information of the current webpage to the first mobile terminal according to the link information.

The server may send an image acquiring request to a CDN (Content Delivery Network, content delivery network) system according to the link address information of the image in the current webpage, to request acquisition of image information with a minimum side length larger than a preset value in the current webpage, or image information in a preset format in the current webpage. The CDN system captures the image corresponding to the link address information and processes the image into a thumbnail. The server receives the thumbnail returned by the CDN system. The server sends the thumbnail and the website information of the current webpage to the first mobile terminal.

Figure 2:
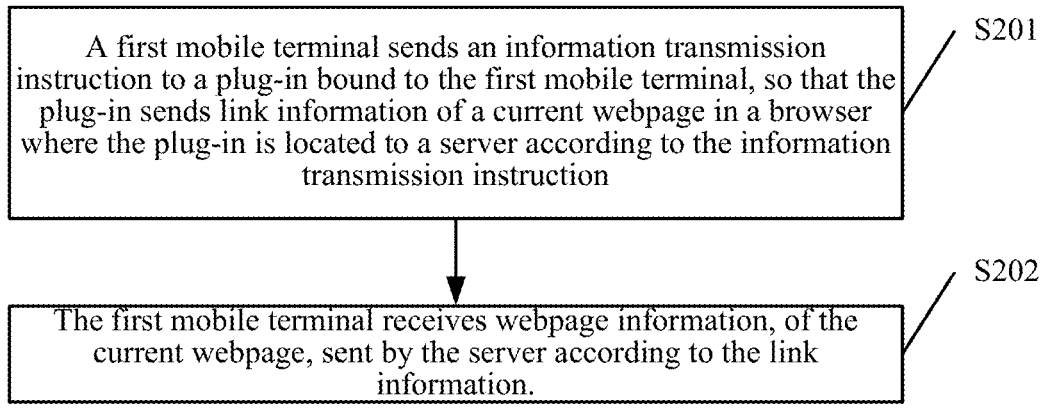
FIG. 2 is a flow chart of another information transmission method according to an embodiment of the present invention.

FIG. 2 is a flow chart of another information transmission method according to an embodiment of the present invention. The method may be an information transmission process executed by a first mobile terminal bound to a plug-in of a browser of a second terminal. The method may include Step S201 to Step S202.

S201: A first mobile terminal sends an information transmission instruction to a plug-in bound to the first mobile terminal, so that the plug-in sends link information of a current webpage in a browser where the plug-in is located to a server according to the information transmission instruction.

The following implementation manners may be used in this step.

In a first implementation manner, the first mobile terminal preferably includes a gravity sensor. The gravity sensor may be a speed sensor, an acceleration sensor, or a gyroscope sensor, for detecting a gravity sensing event in the first mobile terminal. Before performing this step, the first mobile terminal detects a gravity sensing event in real time, and sends, according to the detected gravity sensing event, the information transmission instruction to the plug-in bound to the first mobile terminal, to instruct the plug-in to acquire, according to the information transmission instruction, the link information of the current webpage in the browser where the plug-in is located. For example, if a user of the first mobile terminal intends to apply the webpage information of the current webpage in the browser where the plug-in is located in an instant communication application of the first mobile terminal, the user may shake the first mobile terminal in an interface of the instant communication application to generate a gravity sensing event, to trigger the first mobile terminal to perform this step.

In a second implementation manner, the first mobile terminal pre-stores a voice control command used for instructing information transmission. Before performing this step, the first mobile terminal detects, in real time, voice information input by the user, compares the detected voice information with a preset voice control command, and if the two are matched (namely, are the same or similar), sends the information transmission instruction to the plug-in bound to the first mobile terminal, to instruct the plug-in to acquire, according to the information transmission instruction, the link information of the current webpage in the browser where the plug-in is located. For example, the user of the first mobile terminal inputs voice information "information transmission" to the first mobile terminal, and if the first mobile terminal determines that the voice information is matched with a preset voice control command "information transmission," the first mobile terminal is triggered to perform this step.

In a third implementation manner, the first mobile terminal is preferably set with a particular key, which may include a particular icon key or a particular physical key. The first mobile terminal detects a particular key press event in real time, and sends, according to the detected particular key press event, the information transmission instruction to the plug-in bound to the first mobile terminal, to instruct the plug-in to acquire, according to the information transmission instruction, the link information of the current webpage in the browser where the plug-in is located. For example, if the user of the first mobile terminal clicks a particular icon key on the first mobile terminal and a particular key press event is generated, the first mobile terminal is triggered to perform this step.

S202: The first mobile terminal receives webpage information, of the current webpage, sent by the server according to the link information. In this step, the webpage information received by the first mobile terminal includes website information of the current webpage of the browser where the plug-in is located and a thumbnail.

Figure 3:
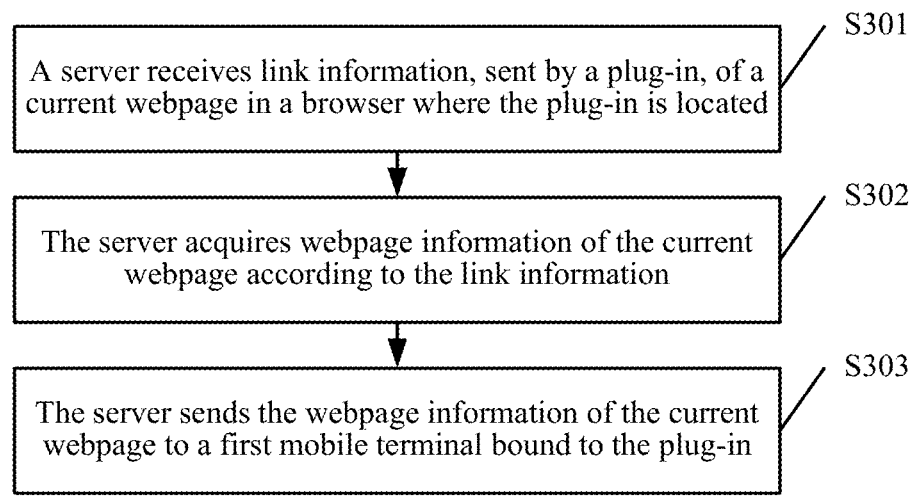
FIG. 3 is a flow chart of still another information transmission method according to an embodiment of the present invention.

FIG. 3 is a flow chart of still another information transmission method according to an embodiment of the present invention. The method may be an information transmission process executed by a server. The method may include Step S301 to Step S303.

S301: A server receives link information, sent by a plug-in, of a current webpage in a browser where the plug-in is located. The link information includes: website information of the current webpage in the browser where the plug-in is located and link address information of an image in the current webpage.

S302: The server acquires webpage information of the current webpage according to the link information.

Two feasible implementation manners exist in this step. In a first feasible implementation manner, the server may send an image acquiring request to a CDN system according to the link information, to request acquisition of image information with a minimum side length larger than a preset value in the current webpage.

Abundant image information may exist in the current webpage, for example, image information of a main body of the webpage, advertisement image information of a floating window in the webpage, or advertisement image information displayed in edges of the webpage. Generally, the advertisement image information in the webpage has a small side length. Therefore, in this step, acquisition of the image information with the minimum side length larger than the preset value may be requested in the current webpage, so that the advertisement image information in the current webpage may be filtered. It should be noted that, the preset value may be set according to an actual condition. For example, the preset value may be set to 100 pixels, or the value of a maximum side length in the advertisement image information, or a value larger than that of the maximum side length in the advertisement image information, or the like.

The CDN system selects, according to the image acquiring request, image information with the minimum side length larger than the preset value in the current webpage, processes the image information into a thumbnail, and returns the thumbnail to the server.

In a second feasible implementation manner, the server may send an image acquiring request to the CDN system according to the link information, to request acquisition of image information in a preset format in the current webpage.

The current webpage may include image information in multiple formats, for example, image information in the JPEG (Joint Photographic Experts Group, joint photographic experts group) format, image information in the BMP (Bitmap, standard image file format) format, image information in the GIF (Graphics Interchange Format, graphics interchange format) format, image information in the TIF (Tagged Image File Format, tagged image file format) format, and the like. The user of the first mobile terminal may set, according to an actual requirement, the format of image information to be transmitted. In this step, the server may request image information of the current webpage according to the format set by the user, and receive a thumbnail returned by the CDN system.

The CDN system selects, according to the image acquiring request, image information in the preset format in the current webpage, processes the image information into a thumbnail, and returns the thumbnail to the server.

In the two feasible implementation manners above, the server acquires the image information of the current webpage from the CDN system. Because the information may exist in multiple network nodes in the CDN system, the hit rate of information acquisition can be ensured. In addition, because the CDN system can select, in real time, a node closest to the server for providing an information acquiring service according to network traffic and the connection state, load condition and response time of each node, the speed and stability of information transmission can be improved.

S303: The server sends the webpage information of the current webpage to a first mobile terminal bound to the plug-in. In this step, the server sends the thumbnail returned by the CDN system and the website information of the current webpage together to the first mobile terminal.

For convenience of information transmission, before sending the webpage information, the server may process the webpage information, for example, may compress and encapsulate the thumbnail and the website information of the current webpage, so as to improve the information transmission rate. It may be understood that, after receiving the processed webpage information, the first mobile terminal correspondingly decapsulates and decompresses the webpage information.

Figure 4:
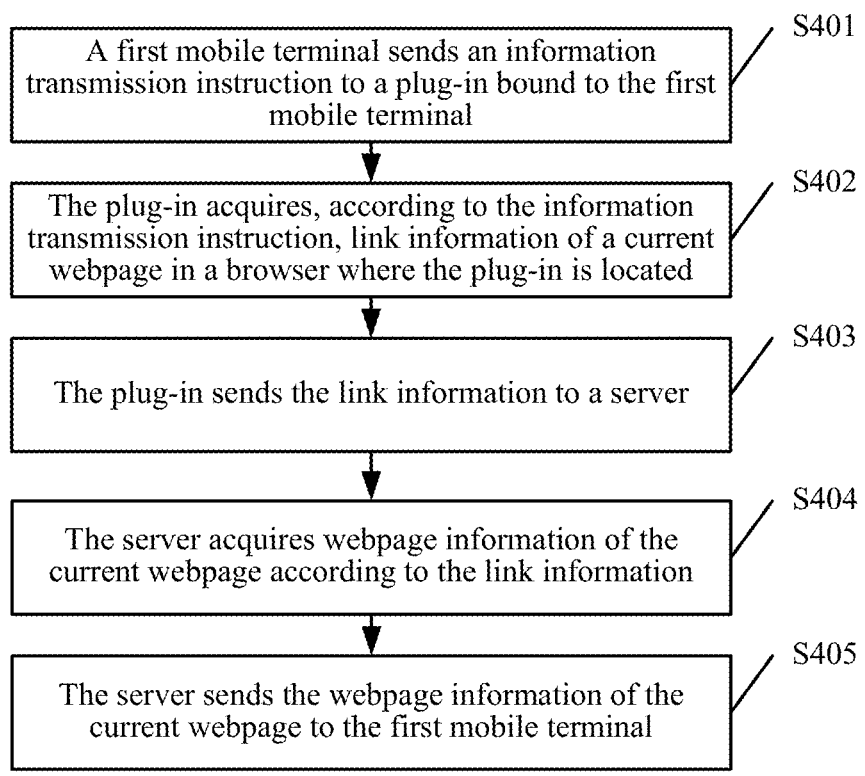
FIG. 4 is a flow chart of still another information transmission method according to an embodiment of the present invention.

FIG. 4 is a flow chart of still another information transmission method according to an embodiment of the present invention. The method may be an information transmission process executed through interaction between a plug-in of a browser of a second terminal, a first mobile terminal bound to the plug-in, and a server. The method may include Step S401 to Step S405.

S401: A first mobile terminal sends an information transmission instruction to a plug-in bound to the first mobile terminal.

For Step S401 in this embodiment, reference may be made to Step S201 in the embodiment shown in FIG. 2, and the details will not be described herein again.

S402: The plug-in acquires, according to the information transmission instruction, link information of a current webpage in a browser where the plug-in is located.

S403: The plug-in sends the link information to a server.

For Steps S402 to S403 in this embodiment, reference may be made to Steps S102 to S103 in the embodiment shown in FIG. 1, and the details will not be described herein again.

S404: The server acquires webpage information of the current webpage according to the link information.

S405: The server sends the webpage information of the current webpage to the first mobile terminal.

For Steps S404 to S405 in this embodiment, reference may be made to Steps S302 to S303 in the embodiment shown in FIG. 3, and the details will not be described herein again.

Figure 5:
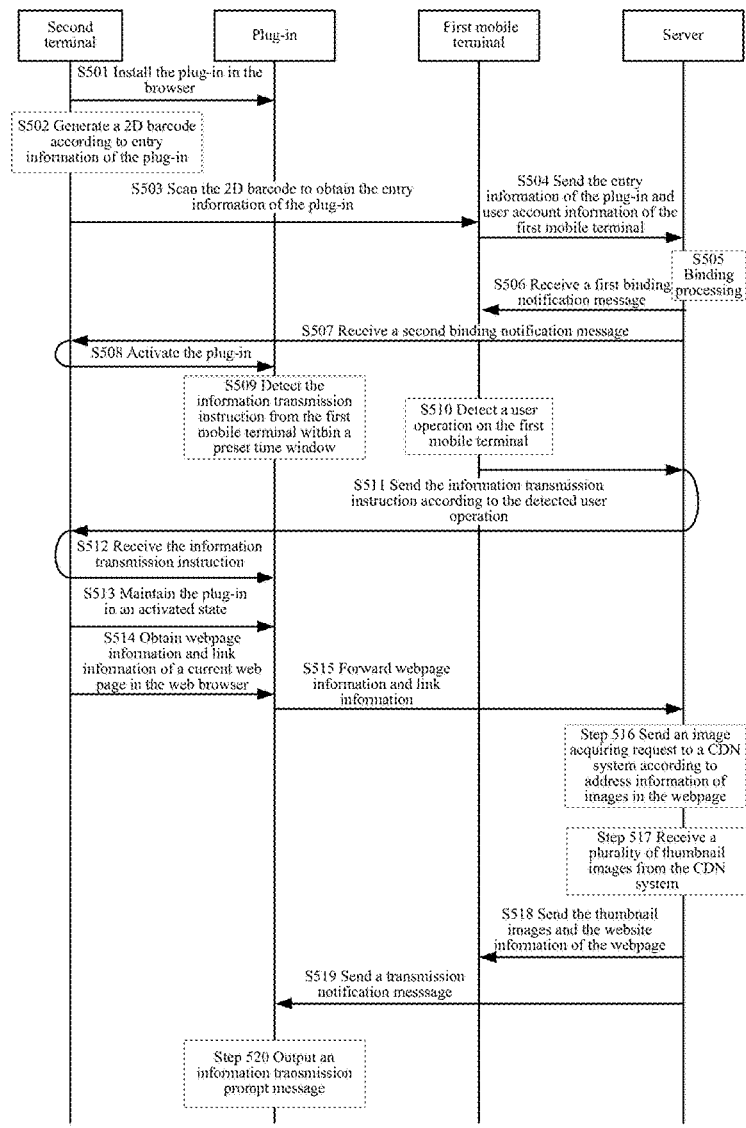
FIG. 5 is a flow chart of still another information transmission method according to an embodiment of the present invention.

FIG. 5 is a flow chart of still another information transmission method according to an embodiment of the present invention. The method may be an information transmission process executed through interaction between a plug-in of a browser of a second terminal, a first mobile terminal bound to the plug-in, and a server. The method may include Step S501 to Step S520.

S501: A second terminal installs a plug-in in a browser.

The second terminal may download installation information of the plug-in locally, and load the plug-in of the browser by using the local installation information; or the second terminal may access the Internet, to acquire the installation information of the plug-in online, and load the plug-in of the browser.

S502: The second terminal generates a 2D barcode according to entry information of the plug-in.

S503: The first mobile terminal scans and parses the 2D barcode, to obtain the entry information of the plug-in.

The first mobile terminal may scan and parse the 2D barcode by using scanning software in the first mobile terminal, to obtain the entry information of the plug-in. The first mobile terminal may also scan and parse the 2D barcode by using a scanning plug-in in an application of the first mobile terminal, for example, use a 2D barcode scanning plug-in in an instant communication application of the first mobile terminal.

S504: The first mobile terminal sends the entry information of the plug-in and account information of the first mobile terminal to a server for binding.

S505: The server performs binding processing according to the entry information of the plug-in and the account information of the first mobile terminal.

S506: The server delivers a first binding notification message to the first mobile terminal, where the first binding notification message includes the entry information of the plug-in bound to the first mobile terminal.

S507: The server delivers a second binding notification message to the plug-in, where the second binding notification message includes the account information of the first mobile terminal bound to the plug-in.

S508: The second terminal activates the plug-in.

After the plug-in is bound to the first mobile terminal, the user may click the plug-in loaded in the browser of the second terminal. The second terminal activates the plug-in according to the clicking operation of the user. The plug-in executes an information transmission process in activated state.

S509: The plug-in detects whether the information transmission instruction from the first mobile terminal is received within a preset time window, and if yes, Step S412 is performed; and if no, the second terminal deactivates the plug-in.

The preset time may be set according to an actual requirement. For example, the preset time may be set to 2 hours, 3 hours, or the like. Setting the preset time may protect privacy of the user, and prevent unnecessary information transmission from divulging browsing privacy on webpages and use privacy on applications of the first mobile terminal of the user. It may be understood that, after the second terminal deactivates the plug-in, if the information transmission process needs to be re-initiated, the user needs to click the plug-in manually, to trigger the second terminal to re-activate the plug-in.

S510: The first mobile terminal detects a user operation on the first mobile terminal, including a gravity sensing event, a voice control command, or a particular key press event.

S511: The first mobile terminal sends the information transmission instruction according to the detected user operation.

In this step, if the first mobile terminal detects the gravity sensing event, the first mobile terminal sends the information transmission instruction to the plug-in according to the detected gravity sensing event. Alternatively, if the first mobile terminal detects the voice control command, the first mobile terminal sends the information transmission instruction to the plug-in according to the detected voice control command. Alternatively, if the first mobile terminal detects the particular key press event, the first mobile terminal sends the information transmission instruction to the plug-in according to the detected particular key press event.

In this embodiment, the sequence of Step S509 and Steps S510 to S511 is not limited, that is, Steps S510 to S511 may be performed first, followed by Step S509; or Step S509 and Steps S510 to S511 may be performed simultaneously.

S512: The plug-in receives the information transmission instruction sent by the first mobile terminal through the server.

S513: The second terminal maintains the plug-in in activated state.

S514: The plug-in acquires webpage information and link information of a current webpage in the browser where the plug-in is located.

S515: The plug-in sends the webpage information and link information to the server.

For Steps S512 to S515 in this embodiment, reference may be made to Steps S101 to S103 in the embodiment shown in FIG. 1, and the details will not be described herein again.

S516: The server sends an image acquiring request to a CDN system according to the address information of images in the current webpage.

S517: The server receives a plurality of thumbnail images returned by the CDN system.

S518: The server sends the thumbnail images and the website information of the current webpage to the first mobile terminal.

For Steps S516 to S518 in this embodiment, reference may be made to Steps S302 to S303 in the embodiment shown in FIG. 3, and the details will not be described herein again.

S519: The plug-in receives a transmission notification message returned by the server.

The transmission notification message includes: a start transmission notification message, a suspend transmission notification message, or a stop transmission notification message.

S520: The plug-in outputs an information transmission prompt message according to the transmission notification message.

In this step, the plug-in may pop up a floating layer in the browser, and output an information transmission prompt message in the floating layer to prompt the user the current state of information transmission, for example, output a prompt message "information transmission is underway," or output a prompt message "information transmission is completed," or the like. Through transmission with the floating layer, the user can be reminded of the state of information transmission, and the user can know the progress of information transmission. Because the floating layer does not display the transmitted information content, the privacy of the user is protected, avoiding divulging information being transmitted. Preferably, a cancel key may be further provided in the floating layer, and the user may stop the information transmission process by clicking the cancel key, thereby improving man-machine interaction.

In the following, a specific example is taken for describing the information transmission method with reference to FIG. 6.

FIG. 6A to FIG. 6J are illustrative diagrams of an information transmission method according to an embodiment of the present invention. In FIG. 6, transmitted information is website information of a current webpage and link information of an image in a browser of a PC. FIG. 6 shows a process that an image is transmitted between the PC and a mobile phone through "shaking" the mobile phone (namely, through an information transmission instruction issued by shaking the mobile phone).

It is assumed that the first mobile terminal is the mobile phone, and the second terminal is the PC. A user uses the browser of the PC to browse a webpage, and simultaneously uses an instant communication application in the mobile phone. It is assumed that the user intends to transmit the website information and image information of the current webpage between the PC and the mobile phone, so as to use the image information of the webpage in the instant communication application of the mobile phone. A process of "Shaketodown" shown in FIG. 6 is as follows.

Figure 6A:
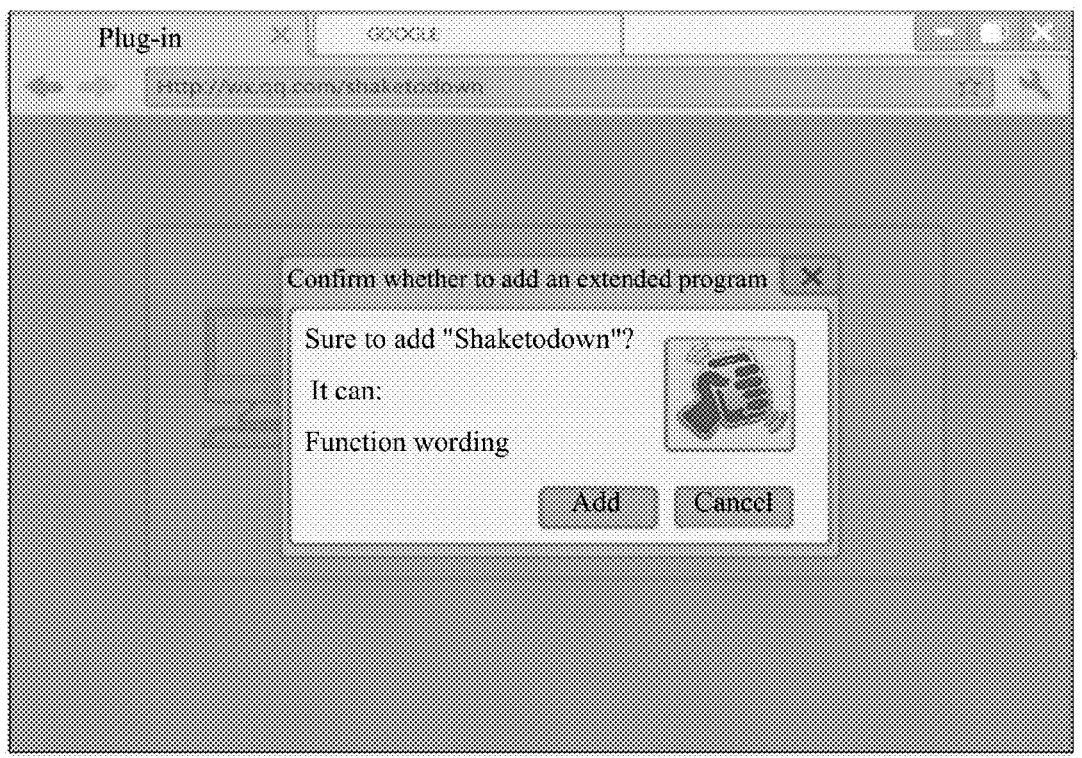
FIG. 6A is a first schematic illustrative diagram of an information transmission method according to an embodiment of the present invention.
Figure 6B:
FIG. 6B is a second schematic illustrative diagram of the information transmission method according to the embodiment of the present invention.
Figure 6C:
FIG. 6C is a third schematic illustrative diagram of the information transmission method according to the embodiment of the present invention.
Figure 6D:
FIG. 6D is a fourth schematic illustrative diagram of the information transmission method according to the embodiment of the present invention.
Figure 6E:
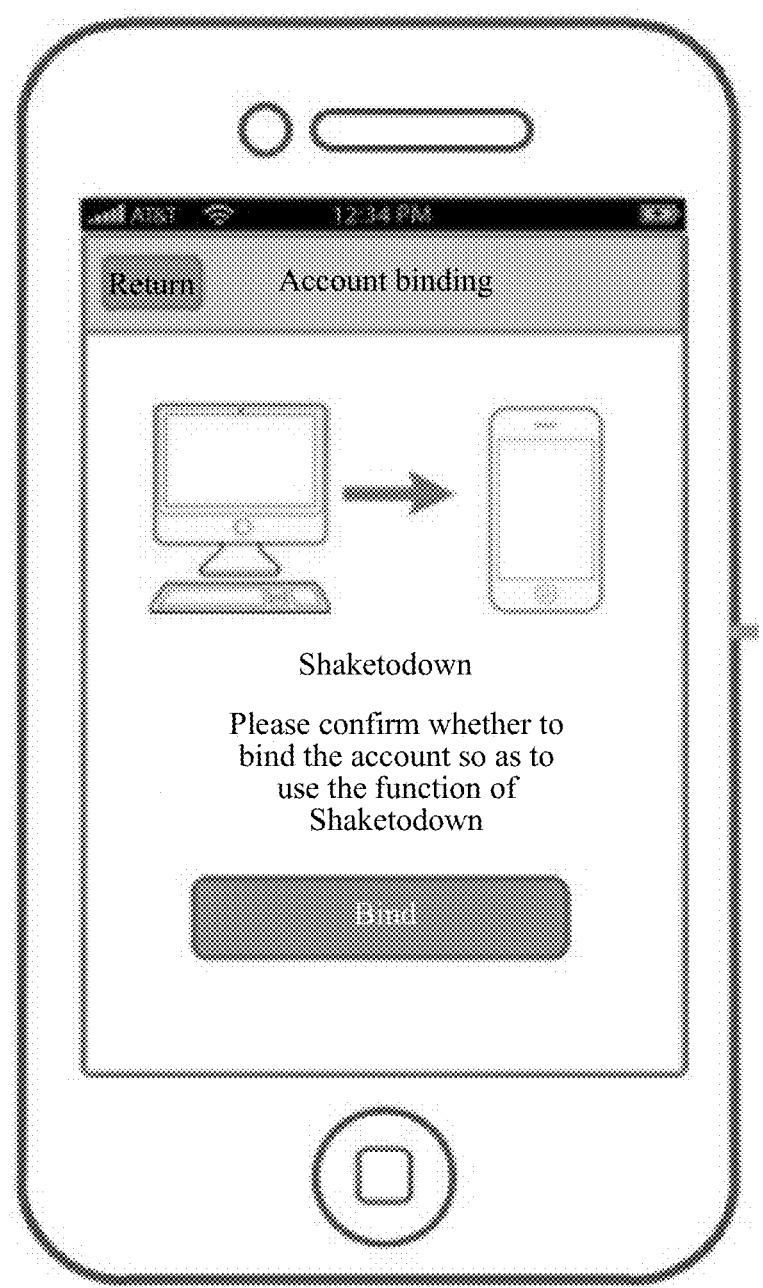
FIG. 6E is a fifth schematic illustrative diagram of the information transmission method according to the embodiment of the present invention.
Figure 6F:
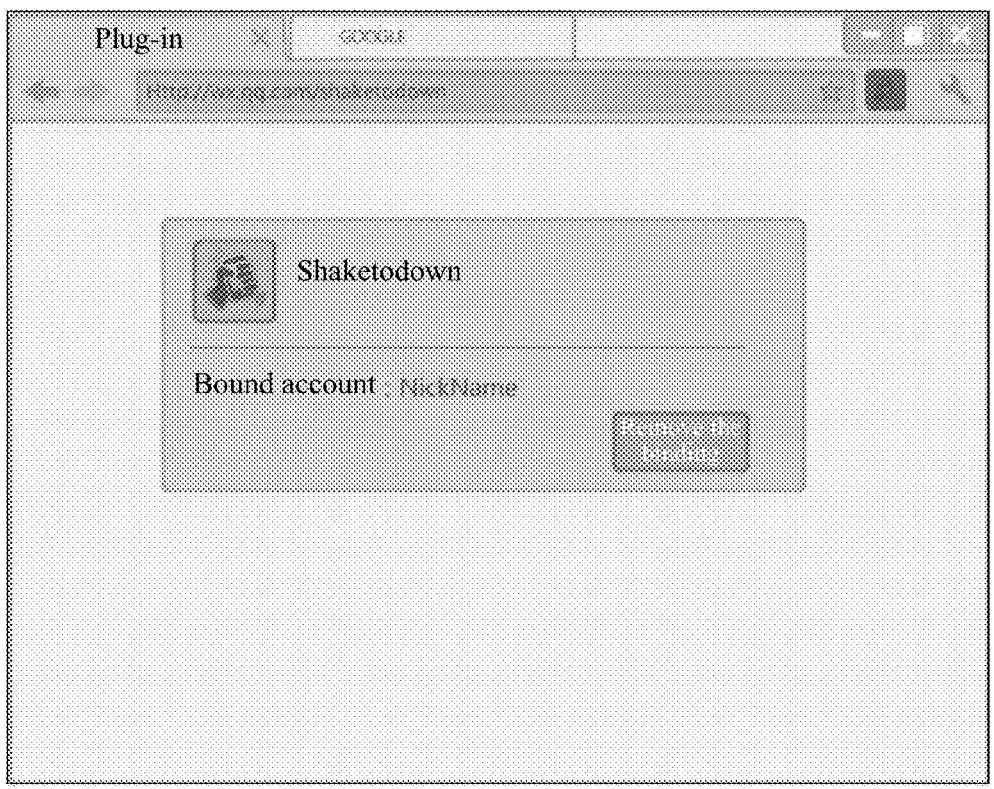
FIG. 6F is a sixth schematic illustrative diagram of the information transmission method according to the embodiment of the present invention.
Figure 6G:
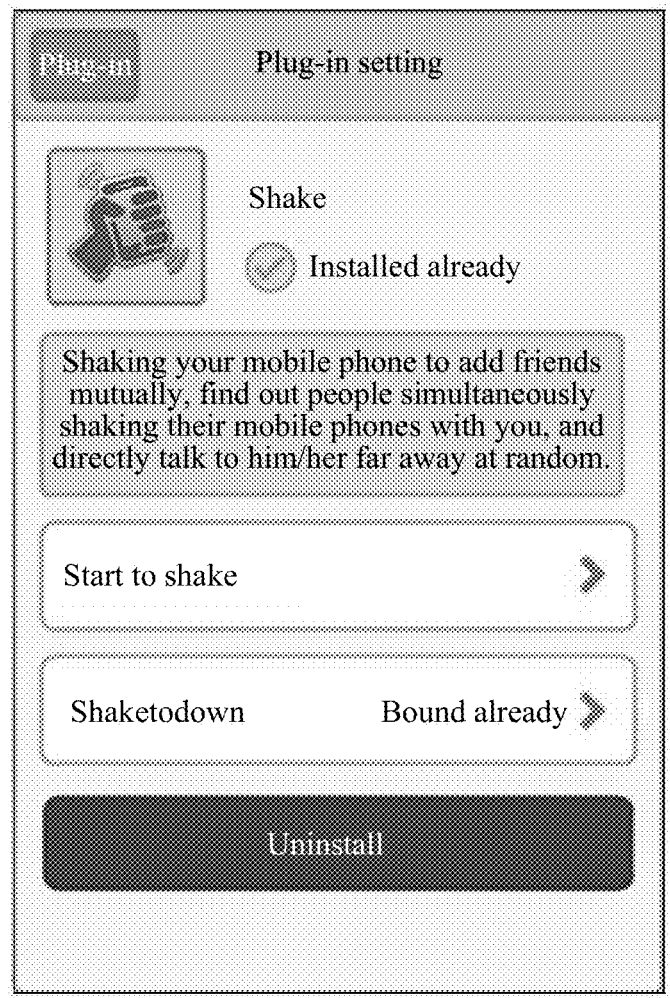
FIG. 6G is a seventh schematic illustrative diagram of the information transmission method according to the embodiment of the present invention.
Figure 6H:
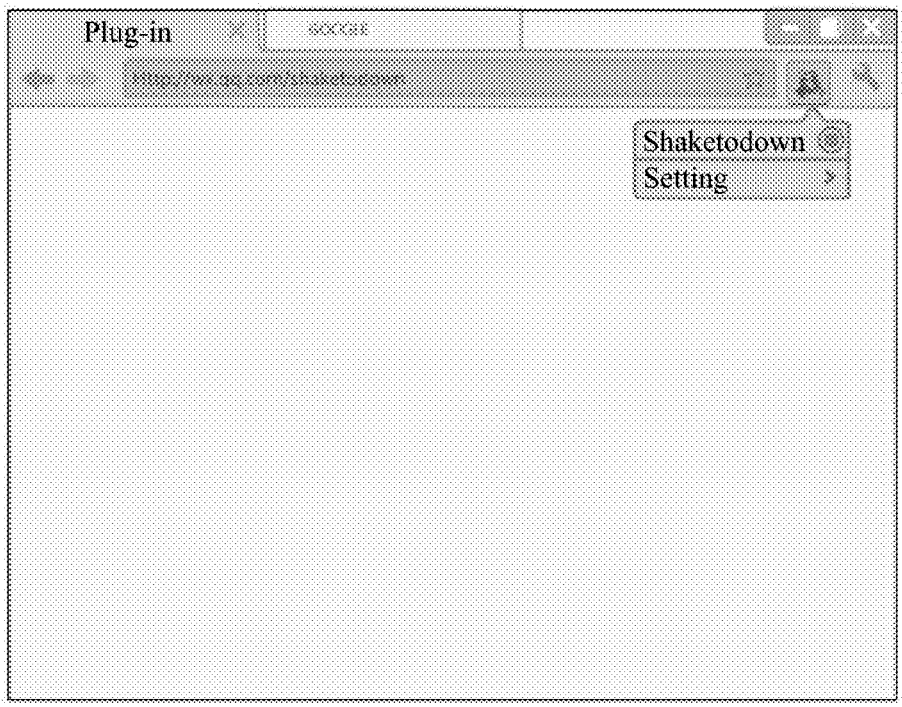
FIG. 6H is an eighth schematic illustrative diagram of the information transmission method according to the embodiment of the present invention.

As shown in FIG. 6A to FIG. 6C, the PC loads the plug-in of the browser, and generates a digital representation (e.g., a 2D barcode) according to entry information of the plug-in. Note that one skilled in the art would understand that the digital representation does not have to be a 2D barcode and it may take the form of a 1D barcode or 3D barcode as long as it is uniquely associated with the plug-in, e.g., within a predefined spatial or temporal scope or both. As shown in FIG. 6D, the mobile phone scans and parses the 2D barcode, to obtain the entry information of the plug-in. Referring to FIG. 6E, when the user clicks the key "Bind" in the mobile phone, the mobile phone sends the entry information of the plug-in and account information of the user for logging in to the instant communication application together to the server for binding. The plug-in of the PC and the mobile phone receive binding notification messages returned by the server respectively, so as to obtain information of each other. As shown in FIG. 6F to FIG. 6G, after the plug-in is bound to the account information of the mobile phone, a prompt is made respectively in the browser of the PC and the mobile phone. The PC activates the plug-in according to a clicking operation on the plug-in by the user. As shown in FIG. 6H, the activated plug-in may execute the "Shaketodown."

Figure 6I:
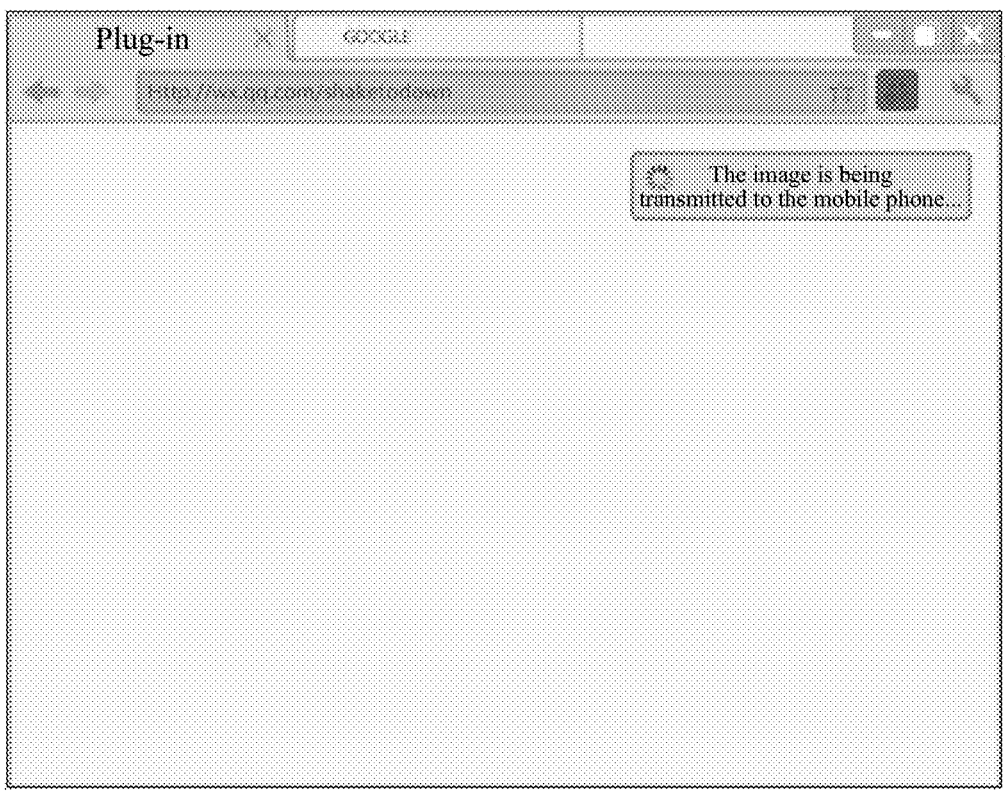
FIG. 6I is a ninth schematic illustrative diagram of the information transmission method according to the embodiment of the present invention.
Figure 6J:
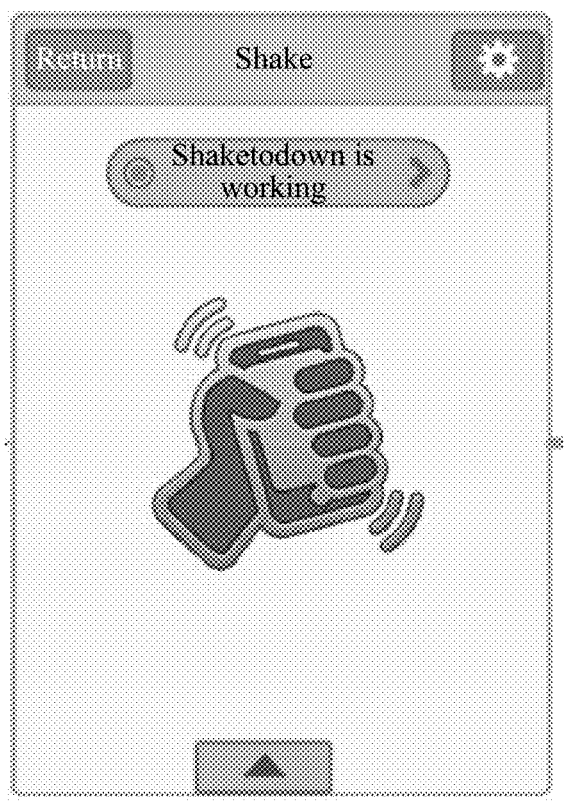
FIG. 6J is a tenth schematic illustrative diagram of the information transmission method according to the embodiment of the present invention.

At the mobile phone side, the mobile phone detects, in real time, whether a gravity sensing event generated by shaking the mobile phone exists in an interface of the instant communication application, and if yes, sends an information transmission instruction to the plug-in. At the PC side, the plug-in detects whether an information transmission instruction sent by the mobile phone is received within a preset time, and if no, the PC deactivates the plug-in, and waits for a next clicking operation on the plug-in by the user so as to trigger the PC to activate the plug-in; and if yes, the PC maintains the plug-in in activated state, and the plug-in captures website information of the current webpage and link address information of an image in the browser, and sends the website information and the link address information of the image to the server. The server sends an image acquiring request to a CDN system according to the link address information. The CDN system captures the image corresponding to the link address information, processes the image into a thumbnail, and returns the thumbnail to the server. The server returns the thumbnail returned by the CDN system and the website information of the current webpage together to the mobile phone, and simultaneously returns a transmission notification message to the plug-in of the browser of the PC. The plug-in of the browser outputs an information transmission prompt message by using a floating layer. As shown in FIG. 6I, the plug-in of the browser prompts the user the state of information transmission by using the floating layer. Preferably, the floating layer further includes a cancel key, and the user of the mobile phone may cancel the information transmission process by clicking the cancel key in the floating layer. As shown in FIG. 6J, the mobile phone may also output an information transmission prompt message, to prompt the user the state of information transmission. After receiving the website information of the current webpage and the thumbnail from the server, the mobile phone may display, in the instant communication application, the received webpage or image information on the webpage, and share it in an application such as a microblog application, a short message application or an SNS (Social Networking Services, social networking services) application in the mobile phone. For example, the mobile phone may display a link to the webpage and a list view or 2D grid view of the thumbnail images returned by the server. In response to a user selection of the link to the webpage, a web browser application embedded in the instant communication application may be invoked to render the webpage. Alternatively, a separate web browser application may be invoked to render the webpage while the instant communication application is temporarily pushed to the background of the mobile phone. Similarly, a user selection of one of the thumbnail images triggers the instant communication application to initiate a request for the corresponding full-size image to the remote server or a web server hosting the full-size image. In some implementations, the instant communication application keeps a download history, e.g., the last 100 images or webpages or both that the user downloads onto the mobile phone using the shaketodown feature according to some embodiments of the present application.

After the information transmission process is completed, if the plug-in is maintained in activated state, it may enter a next information transmission process; and the user may also click the plug-in to trigger the PC to deactivate the plug-in. Alternatively, when a user of the mobile phone exits from or deactivates the shaketodown feature, the mobile phone sends an instruction to the second terminal through the server. In response to the instruction, the web browser deactivates the plug-in accordingly.

In the embodiment of the present invention, a plug-in captures, according to an information transmission instruction from a terminal bound to the plug-in, link information of a current webpage in a browser where the plug-in is located, and sends the link information to a server to trigger the server to return webpage information of the current webpage to the terminal bound to the plug-in, thereby implementing information transmission between the plug-in of the browser and the terminal that are bound to each other, and improving the convenience of information transmission.

An embodiment of the present invention discloses a computer storage medium. The computer storage medium stores a program. When being executed, the program includes a part or all of steps of the information transmission methods described in the embodiments shown in FIG. 1 to FIG. 6.

An information transmission apparatus provided by an embodiment of the present invention is described in detail in the following with reference to FIG. 7 to FIG. 8. It may be understood that, the apparatus described in the following may be applied in the methods shown in FIG. 1 to FIG. 6.

Figure 7:
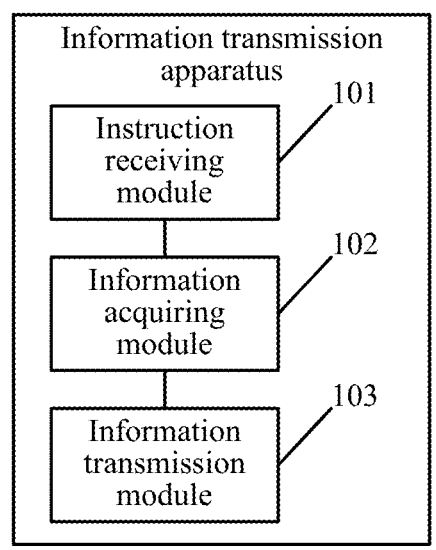
FIG. 7 is a schematic structural diagram of an information transmission apparatus according to an embodiment of the present invention.

FIG. 7 is a schematic structural diagram of an information transmission apparatus according to an embodiment of the present invention. The information transmission apparatus includes one or more processors for executing modules, programs and/or instructions stored in memory and thereby performing predefined operations; one or more network or other communications interfaces; and one or more communication buses for interconnecting these components. In some implementations, the information transmission apparatus includes a user interface comprising a display device and one or more input devices (e.g., keyboard or mouse). In some implementations, the memory includes high-speed random access memory, such as DRAM, SRAM, or other random access solid state memory devices. In some implementations, memory includes non-volatile memory, such as one or more magnetic disk storage devices, optical disk storage devices, flash memory devices, or other non-volatile solid state storage devices. Memory, or alternately one or more storage devices (e.g., one or more nonvolatile storage devices) within memory, includes a non-transitory computer readable storage medium. In some implementations, memory or the computer readable storage medium of memory stores an instruction receiving module 101, an information acquiring module 102, and an information transmission module 103.

The instruction receiving module 101 is configured to receive an information transmission instruction from a first mobile terminal bound to the information transmission apparatus.

The information acquiring module 102 is configured to acquire, according to the information transmission instruction, link information of a current webpage in a browser where the information transmission apparatus is located. The link information includes: website information of the current webpage and link address information of an image in the current webpage.

The information transmission module 103 is configured to send the link information to a server, so that the server sends webpage information of the current webpage to the first mobile terminal according to the link information.

The server may send an image acquiring request to a CDN system according to link address information of an image in the current webpage, to request acquisition of image information with a minimum side length larger than a preset value in the current webpage, or image information in a preset format in the current webpage. The CDN system captures the image corresponding to the link address information and processes the image into a thumbnail. The server receives the thumbnail returned by the CDN system. The server sends the thumbnail and the website information of the current webpage to the first mobile terminal.

Figure 8:
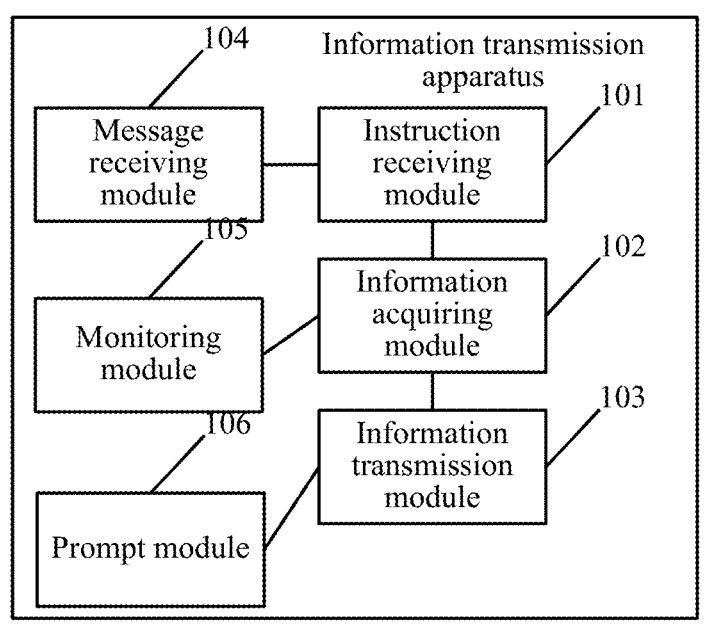
FIG. 8 is a schematic structural diagram of another information transmission apparatus according to an embodiment of the present invention.

FIG. 8 is a schematic structural diagram of another information transmission apparatus according to an embodiment of the present invention. The information transmission apparatus may be a plug-in loaded in a browser of a second terminal. The apparatus may include: an instruction receiving module 101, an information acquiring module 102, an information transmission module 103, a message receiving module 104, a detecting module 105, and a prompt module 106. For the instruction receiving module 101, the information acquiring module 102 and the information transmission module 103, reference may be made to the related description in the embodiment shown in FIG. 7, and the details will not be described herein again.

The message receiving module 104 is configured to receive a second binding notification message delivered by the server, where the second binding notification message includes account information of the first mobile terminal bound to the plug-in.

The detecting module 105 is configured to detect whether the information transmission instruction sent by the bound first mobile terminal is received within a preset time window, and if the information transmission instruction from the first mobile terminal is received within the preset time window, maintain in activated state, and instruct the information acquiring module 102 to acquire the webpage information of the current webpage in the browser where the information transmission apparatus is located; and if the information transmission instruction from the first mobile terminal is not received within the preset time window, enter a deactivated state according to a deactivation operation of the second terminal.

The prompt module 106 is configured to output an information transmission prompt message according to a transmission notification message.

The transmission notification message includes: a start transmission notification message, a suspend transmission notification message, or a stop transmission notification message. The prompt module 106 may pop up a floating layer in the browser, output an information transmission prompt message in the floating layer, and prompt the user the current state of information transmission, for example, output a prompt message "information transmission is underway," or output a prompt message "information transmission is completed," or the like. Through transmission with the floating layer, the user can be reminded of the state of information transmission, and the user can know the progress of information transmission. Because the floating layer does not display the transmitted information content, the privacy of the user is protected, avoiding divulging information being transmitted. Preferably, a cancel key may be further provided in the floating layer, and the user may stop the information transmission process by clicking the cancel key, thereby improving man-machine interaction.

It should be noted that, functions of functional modules of the information transmission apparatus of the embodiment of the present invention may specifically be implemented according to the methods in the foregoing method embodiments. For the specific implementation process, reference may be made to the related description of the foregoing method embodiments, and the details will not be described herein again.

In the embodiment of the present invention, a plug-in captures, according to an information transmission instruction from a terminal bound to the plug-in, link information of a current webpage in a browser where the plug-in is located, and sends the link information to a server to trigger the server to return webpage information of the current webpage to the terminal bound to the plug-in, thereby implementing information transmission between the plug-in of the browser and the terminal that are bound to each other, and improving the convenience of information transmission.

A second terminal provided by an embodiment of the present invention is described in detail in the following with reference to FIG. 9 to FIG. 10. It may be understood that, the second terminal described in the following may be applied in the methods shown in FIG. 1 to FIG. 6.

Figure 9:
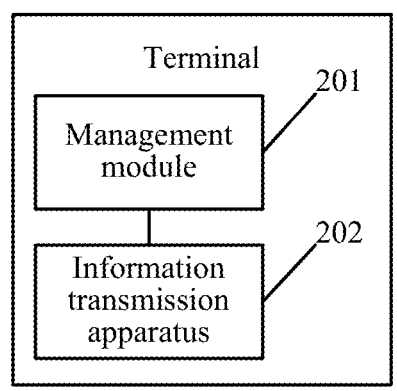
FIG. 9 is a schematic structural diagram of a terminal according to an embodiment of the present invention.
Figure 10:
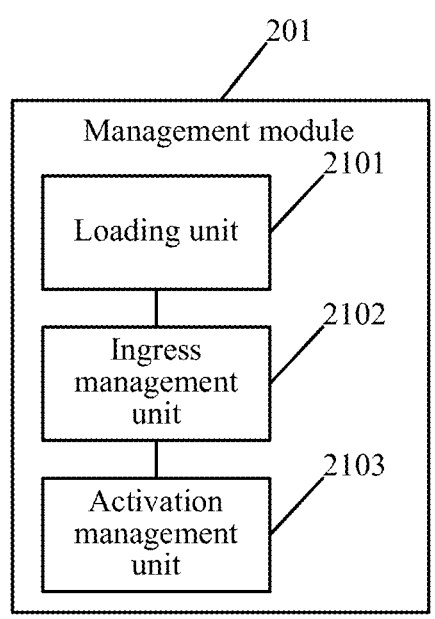
FIG. 10 is a schematic structural diagram of an embodiment of a management module shown in FIG. 9.

FIG. 9 is a schematic structural diagram of a terminal according to an embodiment of the present invention. The terminal may include one or more processors for executing modules, programs and/or instructions stored in memory and thereby performing predefined operations; one or more network or other communications interfaces; and one or more communication buses for interconnecting these components. In some implementations, the terminal includes a user interface comprising a display device and one or more input devices (e.g., keyboard or mouse). In some implementations, the memory includes high-speed random access memory, such as DRAM, SRAM, or other random access solid state memory devices. In some implementations, memory includes non-volatile memory, such as one or more magnetic disk storage devices, optical disk storage devices, flash memory devices, or other non-volatile solid state storage devices. Memory, or alternately one or more storage devices (e.g., one or more nonvolatile storage devices) within memory, includes a non-transitory computer readable storage medium. In some implementations, memory or the computer readable storage medium of memory stores a management module 201 and an information transmission apparatus 202. The information transmission apparatus 202 may be the information transmission apparatus shown in any one of the embodiments of FIG. 7 to FIG. 8. For the structure of the information transmission apparatus 202, reference may be made to the related description of the embodiments shown in FIG. 7 to FIG. 8, and the details will not be described herein again.

The management module 201 is configured to load the information transmission apparatus 202 in the browser, and manage the information transmission apparatus 202.

That the management module 201 manages the information transmission apparatus 202 includes: loading, entry management, and activation management. Specifically, reference is also made to FIG. 10, which is a schematic structural diagram of an embodiment of the management module shown in FIG. 9. The management module 201 may include: a loading unit 2101, an entry management unit 2102, and an activation management unit 2103.

The loading unit 2101 is configured to load the information transmission apparatus in the browser.

The entry management unit 2102 is configured to generate a 2D barcode according to entry information of the information transmission apparatus.

The activation management unit 2103 is configured to: after the information transmission apparatus and the first mobile terminal are bound to each other, activate the information transmission apparatus, or when the information transmission instruction from the first mobile terminal is not received by the information transmission apparatus within a preset time window, deactivate the information transmission apparatus.

It should be noted that, functions of functional modules of the second terminal of the embodiment of the present invention may specifically be implemented according to the methods in the foregoing method embodiments. For the specific implementation process, reference may be made to the related description of the foregoing method embodiments, and the details will not be described herein again.

In the embodiment of the present invention, a plug-in captures, according to an information transmission instruction from a terminal bound to the plug-in, link information of a current webpage in a browser where the plug-in is located, and sends the link information to a server to trigger the server to return webpage information of the current webpage to the terminal bound to the plug-in, thereby implementing information transmission between the plug-in of the browser and the terminal that are bound to each other, and improving the convenience of information transmission.

A first mobile terminal provided by an embodiment of the present invention is described in detail in the following with reference to FIG. 11 to FIG. 13. It may be understood that, the apparatus described in the following may be applied in the methods shown in FIG. 1 to FIG. 6.

Figure 11:
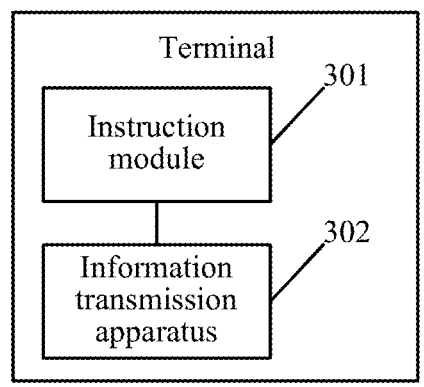
FIG. 11 is a schematic structural diagram of another terminal according to an embodiment of the present invention.

FIG. 11 is a schematic structural diagram of another terminal according to an embodiment of the present invention. The terminal may include one or more processors for executing modules, programs and/or instructions stored in memory and thereby performing predefined operations; one or more network or other communications interfaces; and one or more communication buses for interconnecting these components. In some implementations, the terminal includes a user interface comprising a display device and one or more input devices (e.g., keyboard or mouse). In some implementations, the memory includes high-speed random access memory, such as DRAM, SRAM, or other random access solid state memory devices. In some implementations, memory includes non-volatile memory, such as one or more magnetic disk storage devices, optical disk storage devices, flash memory devices, or other non-volatile solid state storage devices. Memory, or alternately one or more storage devices (e.g., one or more nonvolatile storage devices) within memory, includes a non-transitory computer readable storage medium. In some implementations, memory or the computer readable storage medium of memory stores an instruction module 301 and an information transmission module 302.

The instruction module 301 is configured to send an information transmission instruction to a plug-in bound to the terminal, so that the plug-in sends link information of a current webpage in a browser where the plug-in is located to a server according to the information transmission instruction.

Formation of the information transmission instruction sent by the instruction module 301 may include three feasible implementation manners. For the implementation manners, reference may be made to the related description in Step S201 shown in FIG. 2, and the details will not be described herein again.

The information transmission module 302 is configured to receive webpage information, of the current webpage, sent by the server according to the link information. The webpage information received by the transmission module 302 includes website information of the current webpage of the browser where the plug-in is located and a thumbnail of an image.

Figure 12:
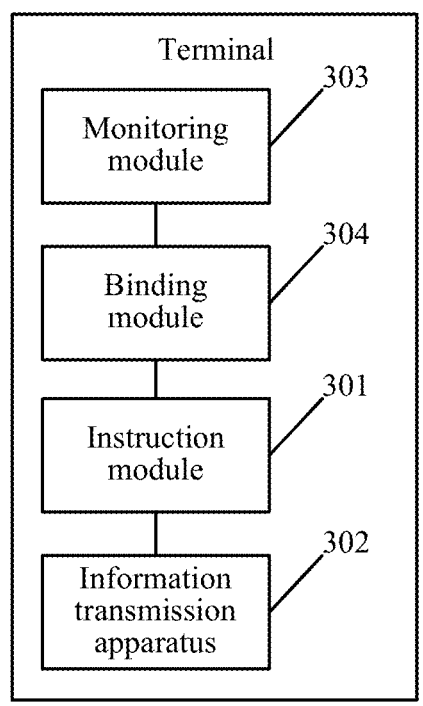
FIG. 12 is a schematic structural diagram of still another terminal according to an embodiment of the present invention.

FIG. 12 is a schematic structural diagram of still another terminal according to an embodiment of the present invention. The terminal may include one or more processors for executing modules, programs and/or instructions stored in memory and thereby performing predefined operations; one or more network or other communications interfaces; and one or more communication buses for interconnecting these components. In some implementations, the terminal includes a user interface comprising a display device and one or more input devices (e.g., keyboard or mouse). In some implementations, the memory includes high-speed random access memory, such as DRAM, SRAM, or other random access solid state memory devices. In some implementations, memory includes non-volatile memory, such as one or more magnetic disk storage devices, optical disk storage devices, flash memory devices, or other non-volatile solid state storage devices. Memory, or alternately one or more storage devices (e.g., one or more nonvolatile storage devices) within memory, includes a non-transitory computer readable storage medium. In some implementations, memory or the computer readable storage medium of memory stores an instruction module 301, an information transmission module 302, a detecting module 303, and a binding module 304. For the structures of the instruction module 301 and the information transmission module 302, reference may be made to the related description in the embodiment shown in FIG. 11, and the details will not be described herein again.

The detecting module 303 is configured to detect a gravity sensing event, and instruct, according to the detected gravity sensing event, the instruction module to send the information transmission instruction to the plug-in; or detect a voice control command, and send the information transmission instruction to the plug-in according to the detected voice control command; or detect a particular key press event, and send the information transmission instruction to the plug-in according to the detected particular key press event.

The binding module 304 is configured to acquire entry information of the plug-in, and interact with the server so as to bind the terminal and the plug-in.

Figure 13:
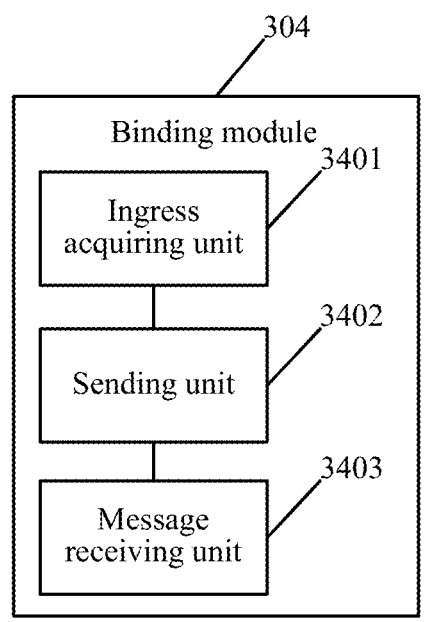
FIG. 13 is a schematic structural diagram of an embodiment of a binding module shown in FIG. 12.

Reference is also made to FIG. 13, which is a schematic structural diagram of an embodiment of the binding module shown in FIG. 12. The binding module 304 may include: an entry acquiring unit 3401, a sending unit 3402, and a message receiving unit 3403.

The entry acquiring unit 3401 is configured to acquire the entry information of the plug-in by scanning a 2D barcode corresponding to the plug-in.

The sending unit 3402 is configured to send the entry information of the plug-in and account information of the terminal to the server for binding.

The message receiving unit 3403 is configured to receive a first binding notification message delivered by the server, where the first binding notification message includes the entry information of the plug-in bound to the first mobile terminal.

It should be noted that, functions of functional modules of the second terminal of the embodiment of the present invention may specifically be implemented according to the methods in the foregoing method embodiments. For the specific implementation process, reference may be made to the related description of the foregoing method embodiments, and the details will not be described herein again.

In the embodiment of the present invention, a plug-in captures, according to an information transmission instruction from a terminal bound to the plug-in, link information of a current webpage in a browser where the plug-in is located, and sends the link information to a server to trigger the server to return webpage information of the current webpage to the terminal bound to the plug-in, thereby implementing information transmission between the plug-in of the browser and the terminal that are bound to each other, and improving the convenience of information transmission.

A server provided by an embodiment of the present invention is described in detail in the following with reference to FIG. 14 to FIG. 16. It may be understood that, the apparatus described in the following may be applied in the methods shown in FIG. 1 to FIG. 6.

Figure 14:
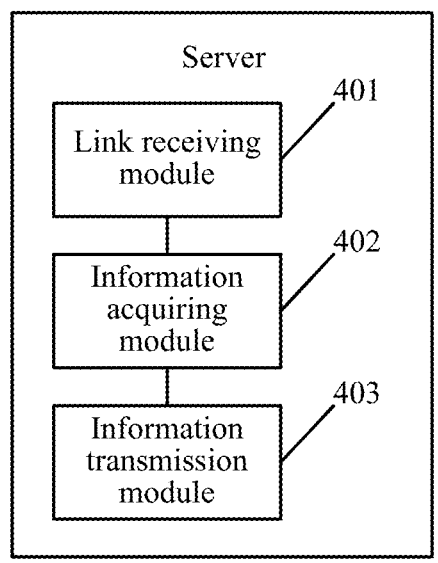
FIG. 14 is a schematic structural diagram of a server according to an embodiment of the present invention.

FIG. 14 is a schematic structural diagram of a server according to an embodiment of the present invention. The server may include one or more processors for executing modules, programs and/or instructions stored in memory and thereby performing predefined operations; one or more network or other communications interfaces; and one or more communication buses for interconnecting these components. In some implementations, the server optionally includes a user interface comprising a display device and one or more input devices (e.g., keyboard or mouse). In some implementations, the memory includes high-speed random access memory, such as DRAM, SRAM, or other random access solid state memory devices. In some implementations, memory includes non-volatile memory, such as one or more magnetic disk storage devices, optical disk storage devices, flash memory devices, or other non-volatile solid state storage devices. Memory, or alternately one or more storage devices (e.g., one or more nonvolatile storage devices) within memory, includes a non-transitory computer readable storage medium. In some implementations, memory or the computer readable storage medium of memory stores a link receiving module 401, an information acquiring module 402, and an information transmission module 403.

The link receiving module is configured to receive link information, sent by a plug-in, of a current webpage in a browser where the plug-in is located. The link information includes: website information of the current webpage in the browser where the plug-in is located and link address information of an image in the current webpage.

The information acquiring module 402 is configured to acquire webpage information of the current webpage according to the link information.

Two feasible implementation manners may exist in the acquiring process of the information acquiring module 402. For the two feasible implementation manners, reference may be made to the related description in Step S302 shown in FIG. 3, and the details will not be described herein again.

The information transmission module 403 is configured to send the webpage information of the current webpage to a first mobile terminal bound to the plug-in. The information transmission module 403 sends a thumbnail returned by a CDN system and the website information of the current webpage in the browser where the plug-in is located together to the first mobile terminal.

Figure 15:
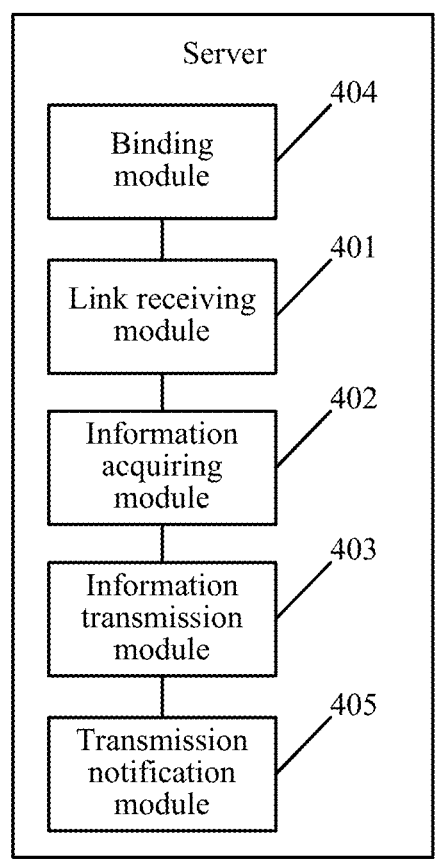
FIG. 15 is a schematic structural diagram of another server according to an embodiment of the present invention.

FIG. 15 is a schematic structural diagram of another server according to an embodiment of the present invention. The server may include one or more processors for executing modules, programs and/or instructions stored in memory and thereby performing predefined operations; one or more network or other communications interfaces; and one or more communication buses for interconnecting these components. In some implementations, the server optionally includes a user interface comprising a display device and one or more input devices (e.g., keyboard or mouse). In some implementations, the memory includes high-speed random access memory, such as DRAM, SRAM, or other random access solid state memory devices. In some implementations, memory includes non-volatile memory, such as one or more magnetic disk storage devices, optical disk storage devices, flash memory devices, or other non-volatile solid state storage devices. Memory, or alternately one or more storage devices (e.g., one or more nonvolatile storage devices) within memory, includes a non-transitory computer readable storage medium. In some implementations, memory or the computer readable storage medium of memory stores a link receiving module 401, an information acquiring module 402, an information transmission module 403, a binding module 404, and a transmission notification module 405. For the structures of the instruction receiving module 401, the information acquiring module 402 and the information transmission module 403, reference may be made to the related description in the embodiment shown in FIG. 14, and the details will not be described herein again.

The binding module 404 is configured to bind the plug-in and the first mobile terminal according to entry information of the plug-in and account information of the first mobile terminal that are sent by the first mobile terminal.

Figure 16:
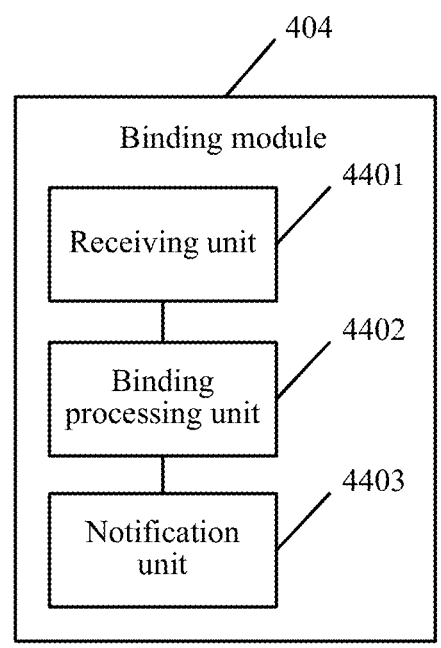
FIG. 16 is a schematic structural diagram of an embodiment of a binding module shown in FIG. 15.

Reference is also made to FIG. 16, which is a schematic structural diagram of an embodiment of the binding module shown in FIG. 15. The binding module 404 may include: a receiving unit 4401, a binding processing unit 4402, and a notification unit 4403.

The receiving unit 4401 is configured to receive the entry information of the plug-in and the account information of the first mobile terminal that are sent by the first mobile terminal.

The binding processing unit 4402 is configured to bind the entry information of the plug-in and the account information of the first mobile terminal.

The notification unit 4403 is configured to deliver a first binding notification message to the first mobile terminal, where the first binding notification message includes the entry information of the plug-in bound to the first mobile terminal, and deliver a second binding notification message to the second terminal, where the second binding notification message includes the account information of the first mobile terminal bound to the plug-in.

The transmission notification module 405 is configured to return a transmission notification message to the plug-in. The transmission notification message includes: a start transmission notification message, a suspend transmission notification message, or a stop transmission notification message. The plug-in may output an information transmission prompt message according to the transmission notification message returned by the transmission notification module 405.

In the embodiment of the present invention, a plug-in captures, according to an information transmission instruction from a terminal bound to the plug-in, link information of a current webpage in a browser where the plug-in is located, and sends the link information to a server to trigger the server to return webpage information of the current webpage to the terminal bound to the plug-in, thereby implementing information transmission between the plug-in of the browser and the terminal that are bound to each other, and improving the convenience of information transmission.

An information transmission system provided by an embodiment of the present invention is described in detail in the following with reference to FIG. 17. It may be understood that, the system described in the following may be applied in the methods shown in FIG. 1 to FIG. 6.

Figure 17:
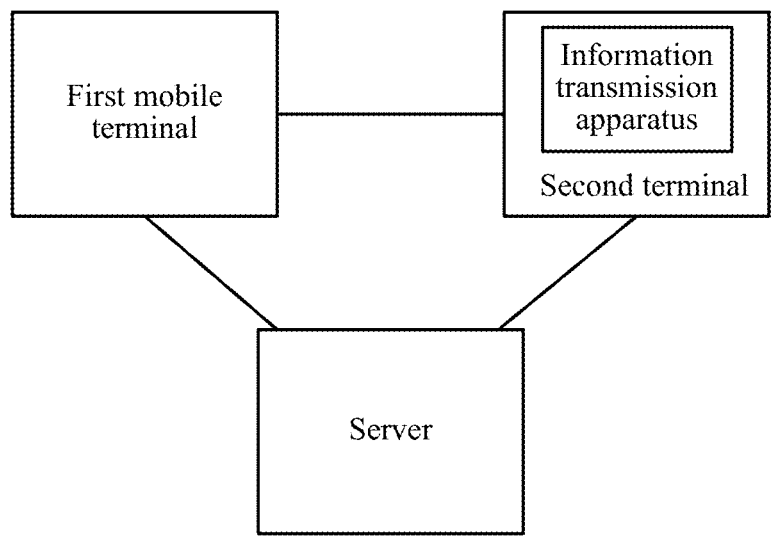
FIG. 17 is a schematic structural diagram of an information transmission system according to an embodiment of the present invention.

FIG. 17 is a schematic structural diagram of an information transmission system according to an embodiment of the present invention. The system may include: a first mobile terminal, a second terminal, and a server. The first mobile terminal may be the terminal shown in any one of the embodiments of FIG. 11 to FIG. 13, the second terminal may be the terminal shown in any one of the embodiments of FIG. 9 to FIG. 10, and the server may be the server shown in any one of the embodiments of FIG. 14 to FIG. 16. Furthermore, as shown in FIG. 17, the browser of the second terminal is loaded with the information transmission apparatus shown in any one of the embodiments of FIG. 7 to FIG. 8, and the apparatus may be a plug-in. For the structures and functional implementations of the apparatuses in the system, reference may be made to the related description of the embodiments above, and the details will not be described herein again.

In the embodiment of the present invention, a plug-in captures, according to an information transmission instruction from a terminal bound to the plug-in, link information of a current webpage in a browser where the plug-in is located, and sends the link information to a server to trigger the server to return webpage information of the current webpage to the terminal bound to the plug-in, thereby implementing information transmission between the plug-in of the browser and the terminal that are bound to each other, and improving the convenience of information transmission.

Those of ordinary skill in the art should understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), a random access memory (Random Access Memory, RAM), and the like.

Disclosed above are merely exemplary embodiments of the present invention, which are not intended to limit the protection scope of the present invention. Therefore, equivalent changes made according to claims of the present invention shall still fall within the scope covered by the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. An information transmission method performed at a first mobile terminal having a processor and memory for storing one or more programs to be executed by the processor, the method comprising:
   detecting a predefined user operation on the first mobile terminal to retrieve information from an application running on a second terminal, wherein the application is associated with the first mobile terminal through a remote server;
   in response to the predefined user operation, sending an information transmission instruction to the application at the second terminal through the remote server, wherein the application is configured to return an identifier of a document currently displayed on the second terminal to the remote server in response to the information transmission instruction;
   receiving the document identifier and data associated with the document from the remote server, wherein the data is derived from a predefined type of content in the document; and displaying the received document identifier and the data on a display of the first mobile terminal.

2. The method according to claim 1, wherein the application is a plug-in of a web browser running on the second terminal and the document is a web page displayed in the web browser.

3. The method according to claim 1, wherein the application is associated with the first mobile terminal by:
the application receiving entry information from the remote server and displaying the entry information on the second terminal, wherein the entry information comprises address information and identification information of the application;
the first mobile terminal obtaining the entry information from the second terminal;
the first mobile terminal sending the obtained entry information and user account information associated with the first mobile terminal to the remote server;
the first mobile terminal receiving a first binding notification message from the remote server; and
the application receiving a second binding notification message from the remote server, wherein the second binding notification message comprises the user account information associated with the first mobile terminal.

4. The method according to claim 3, wherein the second terminal is configured to display a digital representation of the entry information so that the first mobile terminal can obtain the entry information by scanning the digital representation.

5. The method according to claim 4, wherein the digital representation is one selected from the group consisting of 1D barcode, 2D barcode, and 3D barcode.

6. The method according to claim 3, wherein, after receiving the second binding notification message, the application is activated to receive the information transmission instruction from the first mobile terminal within a preset time window; if the information transmission instruction from the first mobile terminal is received within the preset time window, the application is triggered to process the document identifier; and if the information transmission instruction from the first mobile terminal is not received within the preset time window, the application is de-activated.

7. The method according to claim 1, wherein detecting the predefined user operation is one selected from the group consisting of:
detecting a gravity sensing event caused by a predefined user movement of the first mobile terminal, and sending an information transmission instruction to the application according to the detected gravity sensing event; or
detecting a voice control command caused by a user of the first mobile terminal, and sending an information transmission instruction to the application according to the detected voice control command; or
detecting a predefined key pressing event caused by a user of the first mobile terminal, and sending an information transmission instruction to the application according to the detected predefined key pressing event.

8. The method according to claim 1, wherein the document currently displayed on the second terminal is a web page and the document identifier comprises address information of the web page; and the remote server is configured to:
send an image acquiring request to a content delivery network (CDN) system according to address information of images in the webpage, the image acquiring request specifying a preset minimum side length value of an image and/or a preset image format; and
receive a plurality of thumbnail images from the CDN system, wherein each thumbnail image corresponds to an image in the webpage that has at least the preset minimum side length value of an image and/or the preset image format.

9. The method according to claim 8, wherein the server is configured to send the address information of the web page, the address information of images in the web page, and the plurality of thumbnail images to the first mobile terminal.

10. The method according to claim 1, wherein, after sending the data associated with the document to the first mobile terminal, the server is configured to send, to the application at the second terminal, a transmission notification message selected from the group consisting of: a start transmission notification message, a suspend transmission notification message, and a stop transmission notification message, and to cause the application to display a prompt message on the second terminal.

11. An information transmission method performed at a second terminal having a processor and memory for storing one or more programs to be executed by the processor, the method comprising:
activating an application at the second terminal, wherein the application is associated with a first mobile terminal through a remote server;
receiving an information transmission instruction sent from the first mobile terminal;
in response to the information transmission instruction:
obtaining a document identifier of a document currently displayed on the second terminal; and
sending the document identifier to the remote server, wherein the remote server is configured to retrieve data associated with the document and sending the document identifier and the retrieved data to the first mobile terminal.

12. The method according to claim 11, wherein the application is a plug-in of a web browser running on the second terminal and the document is a web page displayed in the web browser.

13. The method according to claim 11, wherein the application is associated with the first mobile terminal by:
the application receiving entry information from the remote server and displaying the entry information on the second terminal, wherein the entry information comprises address information and identification information of the application;
the first mobile terminal obtaining the entry information from the second terminal;
the first mobile terminal sending the obtained entry information and user account information associated with the first mobile terminal to the remote server;
the first mobile terminal receiving a first binding notification message from the remote server; and
the application receiving a second binding notification message from the remote server, wherein the second binding notification message comprises the user account information associated with the first mobile terminal.

14. The method according to claim 13, wherein the second terminal is configured to display a digital representation of the entry information so that the first mobile terminal can obtain the entry information by scanning the digital representation.

15. The method according to claim 11, wherein the document currently displayed on the second terminal is a web page and the document identifier comprises address information of the web page; and the remote server is configured to:

send an image acquiring request to a content delivery network (CDN) system according to address information of images in the webpage, the image acquiring request specifying a preset minimum side length value of an image and/or a preset image format; and receive a plurality of thumbnail images from the CDN system, wherein each thumbnail image corresponds to an image in the webpage that has at least the preset minimum side length value of an image and/or the preset image format.

16. The method according to claim 15, wherein the server is configured to send the address information of the web page, the address information of images in the web page, and the plurality of thumbnail images to the first mobile terminal.

17. The method according to claim 11, wherein, after the remote server sends the data associated with the document to the first mobile terminal, the application at the second terminal is configured to receive a transmission notification message selected from the group consisting of: a start transmission notification message, a suspend transmission notification message, and a stop transmission notification message, and render a prompt message on the second terminal.

18. A first mobile terminal, comprising:
one or more processors; and
memory storing one or more programs, wherein the one or more programs, when executed by the one or more processors, cause the first mobile terminal to:
detect a predefined user operation on the first mobile terminal to retrieve information from an application running on a second terminal, wherein the application is associated with the first mobile terminal through a remote server;
in response to the predefined user operation, send an information transmission instruction to the application at the second terminal through the remote server, wherein the application is configured to return an identifier of a document currently displayed on the second terminal to the remote server in response to the information transmission instruction;
receive the document identifier and data associated with the document from the remote server, wherein the data is derived from a predefined type of content in the document; and
display the received document identifier and the data on a display of the first mobile terminal.

19. The first mobile terminal according to claim 18, wherein the first mobile terminal is configured to perform the following operations to be associated with the application at the second terminal:
obtaining entry information from the second terminal, wherein the entry information comprises address information and identification information of the application;
sending the obtained entry information and user account information associated with the first mobile terminal to the remote server; and
receiving a first binding notification message from the remote server.

20. The first mobile terminal according to claim 18, wherein the first mobile terminal detects the predefined user operation in one manner selected from the group consisting of:
detecting a gravity sensing event caused by a predefined user movement of the first mobile terminal, and sending an information transmission instruction to the application according to the detected gravity sensing event; or
detecting a voice control command caused by a user of the first mobile terminal, and sending an information transmission instruction to the application according to the detected voice control command; or
detecting a predefined key pressing event caused by a user of the first mobile terminal, and sending an information transmission instruction to the application according to the detected predefined key pressing event.

* * * * *